(12) United States Patent
Souma et al.

(10) Patent No.: US 8,767,319 B2
(45) Date of Patent: Jul. 1, 2014

(54) INNER-FOCUS LARGE-APERTURE MEDIUM-TELEPHOTO LENS SYSTEM, IMAGING OPTICAL DEVICE, AND DIGITAL APPLIANCE

(75) Inventors: Yoshihito Souma, Sakai (JP); Satoru Shibata, Chiyoda-ku (JP)

(73) Assignees: Konica Minolta Advanced Layers, Inc., Tokyo (JP); Nikon Corporation, Tokyo (JP)

( * ) Notice: Subject to any disclaimer, the term of this patent is extended or adjusted under 35 U.S.C. 154(b) by 108 days.

(21) Appl. No.: 13/582,712

(22) PCT Filed: Feb. 24, 2011

(86) PCT No.: PCT/JP2011/054084
§ 371 (c)(1),
(2), (4) Date: Sep. 4, 2012

(87) PCT Pub. No.: WO2011/108428
PCT Pub. Date: Sep. 9, 2011

(65) Prior Publication Data
US 2012/0327289 A1 Dec. 27, 2012

(30) Foreign Application Priority Data
Mar. 2, 2010 (JP) ................................ 2010-045271

(51) Int. Cl.
*G02B 13/02* (2006.01)
*G02B 15/173* (2006.01)
*G02B 9/58* (2006.01)
*G02B 6/036* (2006.01)
*G02B 9/06* (2006.01)

(52) U.S. Cl.
CPC .............. *G02B 13/02* (2013.01); *G02B 15/173* (2013.01); *G02B 9/58* (2013.01); *G02B 6/03677* (2013.01); *G02B 9/06* (2013.01)
USPC ........... 359/748; 359/745; 359/676; 359/672; 359/794; 359/782; 359/717; 359/746; 359/747

(58) Field of Classification Search
CPC ........ G02B 13/02; G02B 15/173; G02B 9/58; G02B 6/03677; G02B 9/06
USPC .......... 359/745–748, 676, 672, 717, 782, 794
See application file for complete search history.

(56) References Cited

U.S. PATENT DOCUMENTS 4,786,152 A * 11/1988 Arimoto ....................... 359/745
4,852,984 A    8/1989 Takahashi et al.
(Continued)

FOREIGN PATENT DOCUMENTS

JP    1-154111    6/1989
JP    7-199066    8/1995
(Continued)

*Primary Examiner* — Scott J Sugarman
*Assistant Examiner* — Daniele Manikeu
(74) *Attorney, Agent, or Firm* — Cozen O'Connor

(57) ABSTRACT

The disclosed internal focusing large-aperture medium telephoto lens has as lens groups a positive first lens group, a positive second lens group, and a third lens group, in that order from the object side. When focusing on nearby objects, the first lens group and the third lens group have a fixed position relative to the image surface, and the second lens group displaces toward the object side. The second lens group has only one negative lens, and, in order from the object side, has at least a positive lens, a negative lens, and a positive lens. The following expression is fulfilled: $-0.5 < (R1+R2)(R1-R2) < -0.1$ (wherein, R1: radius of curvature of the object side surface of the negative lens in the second lens group; R2: radius of curvature of the image side surface of the negative lens in the second lens group).

20 Claims, 9 Drawing Sheets

(56) References Cited

U.S. PATENT DOCUMENTS

| | | |
|---|---|---|
| 5,640,277 A | 6/1997 | Ohshita |
| 7,764,439 B2 * | 7/2010 | Kamo et al. ............ 359/687 |
| 2009/0244724 A1 | 10/2009 | Shibata |
| 2009/0251795 A1 | 10/2009 | Adachi et al. |

FOREIGN PATENT DOCUMENTS

| | | |
|---|---|---|
| JP | 2009-244696 | 10/2009 |
| JP | 2009-244697 | 10/2009 |
| JP | 2009-244699 | 10/2009 |
| JP | 2009-265657 | 11/2009 |

* cited by examiner

FIG.5
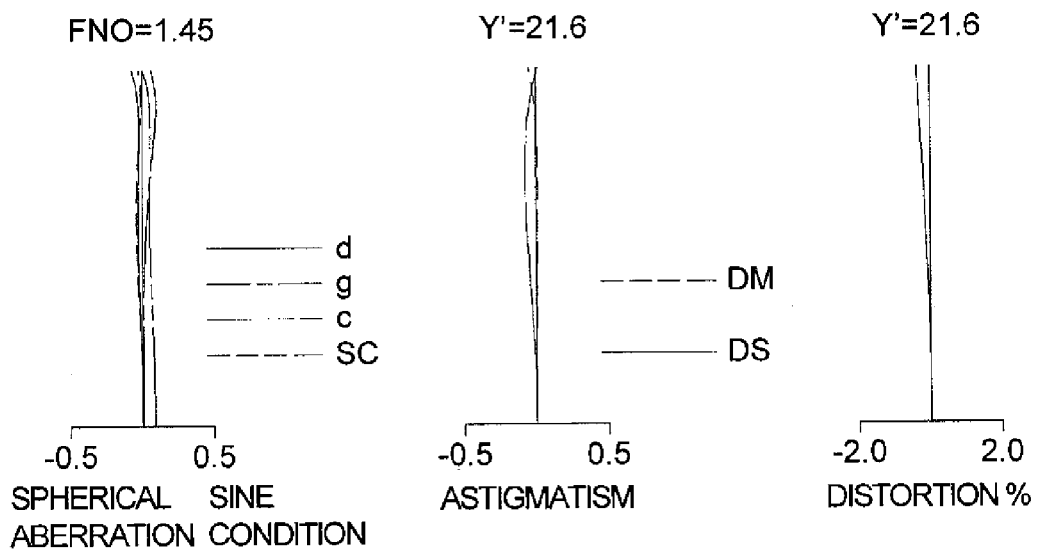
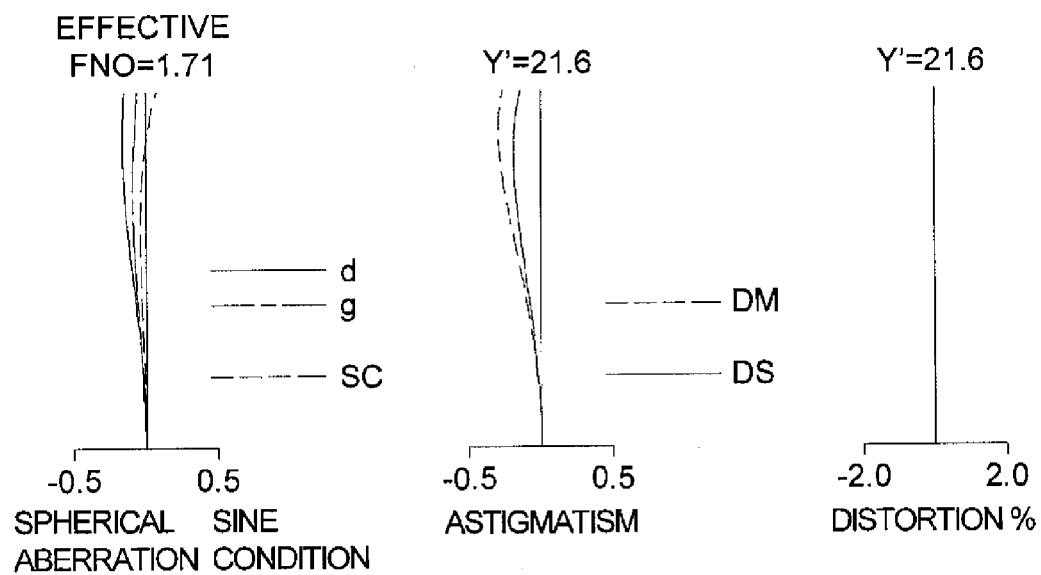

FIG.6
EX2
(POS1)
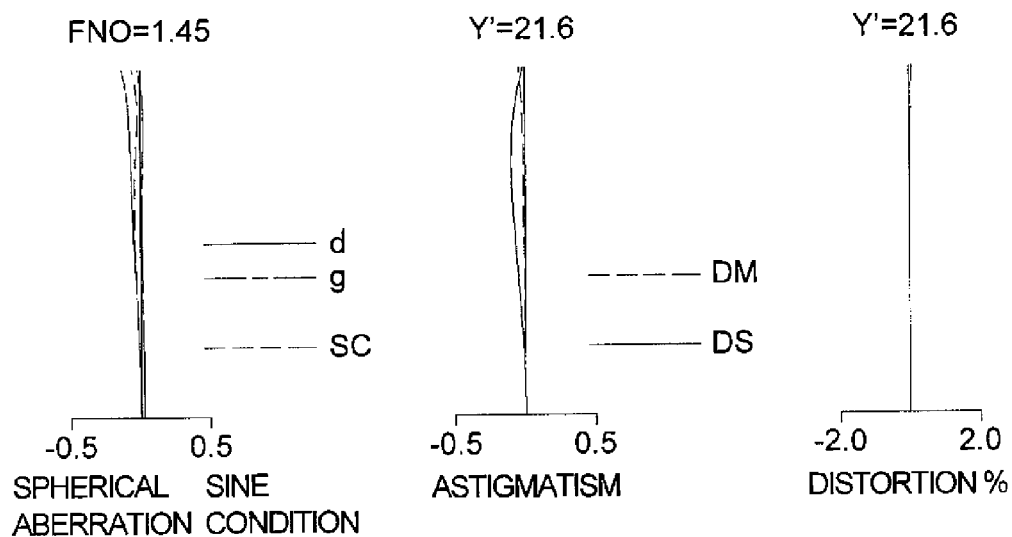
(POS2)
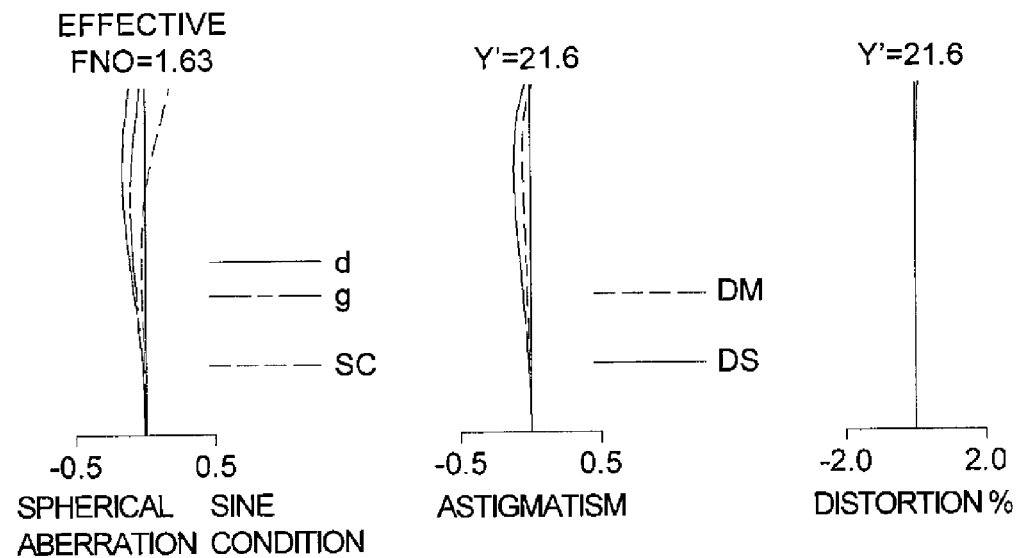

FIG.7
EX3
(POS1)
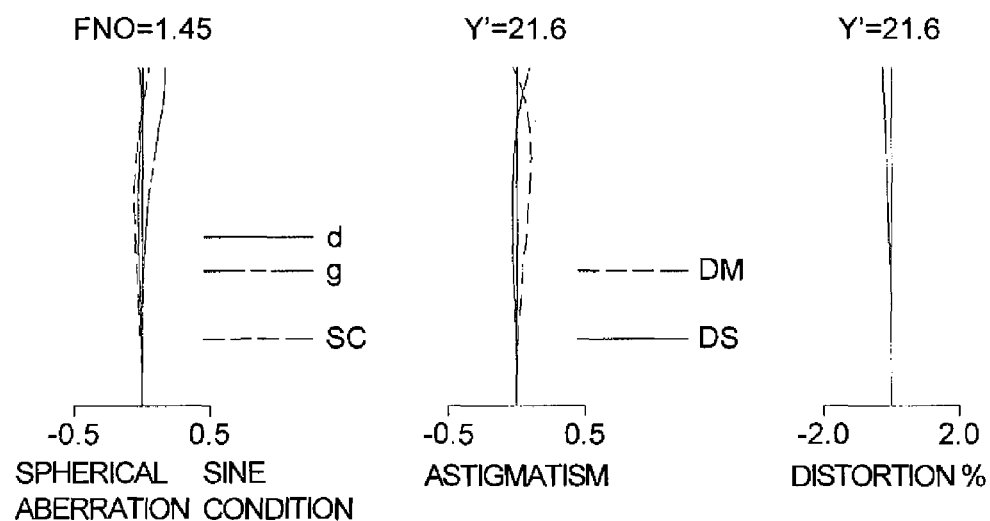
(POS2)
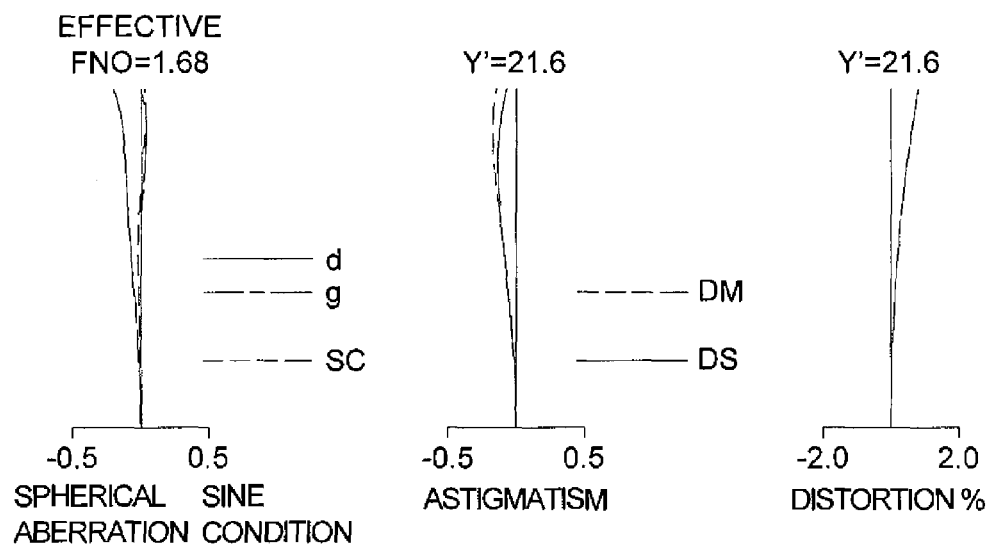

FIG.8
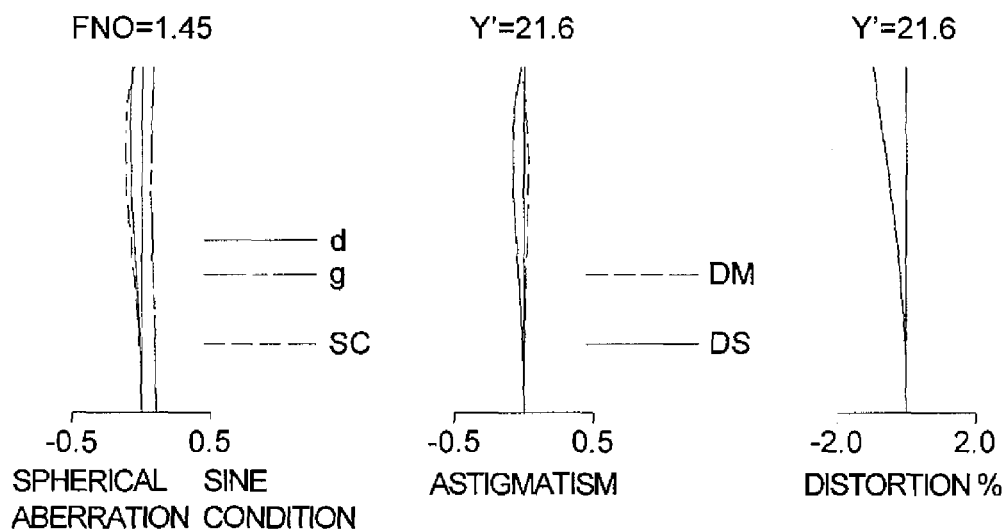
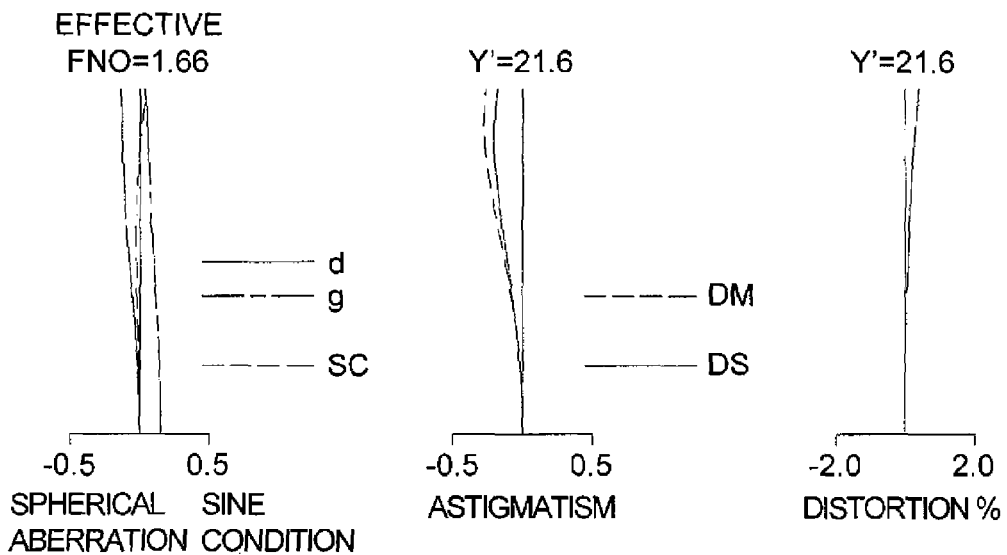

INNER-FOCUS LARGE-APERTURE MEDIUM-TELEPHOTO LENS SYSTEM, IMAGING OPTICAL DEVICE, AND DIGITAL APPLIANCE

RELATED APPLICATIONS

This is a U.S. National Phase Application under 35 USC 371 of International Application PCT/W2011/054084 filed on Feb. 24, 2011.

This application claims the priority of Japanese Application No. 2010-045271 filed Mar. 2, 2010, the content of which is hereby incorporated by reference.

TECHNICAL FIELD

The present invention relates to inner-focus large-aperture medium-telephoto lens systems, imaging optical devices, and digital appliances. More particularly, the invention relates to inner-focus large-aperture medium-telephoto lens systems with an f-number of about 1.4 which form an image of a subject on silver-halide film or on the sensing surface of an image sensor (for example, a solid-state image sensor such as a CCD (charge-coupled device) image sensor or a CMOS (complementary metal-oxide semiconductor) image sensor), imaging optical devices which output, in the form of an electrical signal, an image of a subject acquired by use of such an inner-focus large-aperture medium-telephoto lens system and an image sensor, and digital appliances, such as digital cameras, which incorporate such an imaging optical device and are thereby equipped with an image input capability.

BACKGROUND ART

There have conventionally been proposed inner-focus imaging optical systems suitable for photographic cameras, electronic still cameras, video cameras, etc. (for example, Patent Documents 1 and 2 listed below). With inner-focus imaging optical systems, reducing the weight of the focusing group allows faster automatic focusing. This provides advantages such as a comfortable feel of use, and a reduced motor torque.

LIST OF CITATIONS

Patent Literature

Patent Document 1: JP-A-H1-154111
Patent Document 2: JP-A-H7-199066

SUMMARY OF INVENTION

Technical Problem

The imaging optical system disclosed in Patent Document 1 is composed of a first lens group having a positive refractive power, a second lens group having a negative refractive power, and a third lens group having a positive refractive power, and is so configured as to achieve focusing by moving the second lens group toward the image side. The focusing group is composed of three lens elements, and is comparatively lightweight. Inconveniently, however, the second lens group having a negative refractive power greatly bends off-axial rays, and thus the heights at which off-axial rays pass through the first lens group are comparatively large. This tends to result in a large front lens diameter. Moreover, when the second lens group moves for focusing, the heights at which off-axial rays pass through the second lens group vary greatly, and thus it is difficult to suppress focusing-induced variation in off-axial aberrations.

The imaging optical system disclosed in Patent Document 2 is composed of a first lens group having a positive refractive power, a second lens group having a positive refractive power, and a third lens group having a positive refractive power, and is so configured as to achieve focusing by moving the second lens group toward the image side. The second lens group has a positive refractive power, and therefore no problem of an increased front lens diameter as in Patent Document 1 arises. Moreover, an aperture stop is provided within the second lens group, and focusing-induced variation in off-axial aberrations is comparatively small. Inconveniently, however, the second lens group is composed of about five lens elements, and thus the focusing group cannot be made lightweight.

Inner-focus large-aperture medium-telephoto lens systems tend to be valued not only for imaging performance on the focal plane but also for the quality of bokeh (soft focus as a photographic effect). To obtain bokeh as desired, it is necessary to properly set the residual spherical aberration in a lens system.

The present invention has been made against the above background, and aims to provide inner-focus large-aperture medium-telephoto lens systems that have satisfactory imaging performance from the infinite to the closest distance, that have a light focusing weight, and that allow easy setting of proper residual spherical aberration as desired, and to provide imaging optical devices and digital appliances incorporating such lens systems.

Solution to Problem

To achieve the above object, according to a first aspect of the invention, an inner-focus large-aperture medium-telephoto lens system includes, as lens groups, a first lens group having a positive refractive power, a second lens group having a positive refractive power, and a third lens group in order from the object side. Here, for focusing on a close-distance object, the first and third lens groups remain stationary relative to the image surface and the second lens group moves toward the object side. Moreover, the second lens group includes only one negative lens element and at least includes, in order from the object side, a positive lens element, a negative lens element, and a positive lens element. Furthermore, conditional formula (1) below is fulfilled:

$$-0.5<(R1+R2)/(R1-R2)<-0.1 \qquad (1)$$

where

R1 represents the radius of curvature of the object-side surface of the negative lens element in the second lens group; and R2 represents the radius of curvature of the image-side surface of the negative lens element in the second lens group.

According to a second aspect of the invention, in the inner-focus large-aperture medium-telephoto lens system according to the first aspect of the invention described above, the second lens group has, in order from the object side, a positive lens element, a negative lens element, a positive lens element, and a positive lens element, and conditional formula (2) below is fulfilled:

$$-5<f21/f22<-1 \qquad (2)$$

where f21 represents the focal length of the most object-side positive lens element in the second lens group; and f22 represents the focal length of the negative lens element in the second lens group.

According to a third aspect of the invention, in the inner-focus large-aperture medium-telephoto lens system according to the first or second aspect of the invention described above, formulae (3) and (4) below are fulfilled:

$$0.05 < \beta2 < 0.55 \quad (3)$$

$$0.9 < \beta3 < 1.2 \quad (4)$$

where

β2 represents the paraxial lateral magnification of the second lens group in the infinity-focused condition; and β3 represents the paraxial lateral magnification of the third lens group in the infinity-focused condition.

According to a fourth aspect of the invention, in the inner-focus large-aperture medium-telephoto lens system according to any one of the first to third aspects of the invention described above, the third lens group has, in order from the object side, a negative lens component and a positive lens component.

According to a fifth aspect of the invention, in the inner-focus large-aperture medium-telephoto lens system according to the fourth aspect of the invention described above, the negative lens component is a cemented lens element produced by cementing together a positive meniscus lens element convex to the image side and a biconcave negative lens element, and conditional formula (5) below is fulfilled:

$$|nL31 - nL32| > 0.2 \quad (5)$$

where nL31 represents the refractive index of the positive meniscus lens element convex to the image side; and nL32 represents the refractive index of the biconcave negative lens element.

According to a sixth aspect of the invention, in the inner-focus large-aperture medium-telephoto lens system according to any one of the first to fifth aspects of the invention described above, conditional formula (6) below is fulfilled:

$$0.5 < f2/f < 0.85 \quad (6)$$

where f2 represents the focal length of the second lens group; and f represents the focal length of the entire system.

According to a seventh aspect of the invention, an imaging optical device includes an inner-focus large-aperture medium-telephoto lens system according to any one of the first to sixth aspects of the invention described above and an image sensor which converts an optical image formed on the sensing surface thereof into an electrical signal, and the inner-focus large-aperture medium-telephoto lens system is so arranged that an optical image of a subject is formed on the sensing surface of the image sensor.

According to an eighth aspect of the invention, a digital appliance includes an imaging optical device according to the seventh aspect of the invention, and the digital appliance is thereby additionally equipped with at least one of a function of shooting a still image of the subject and a function of shooting a moving image of the subject.

Advantageous Effects of the Invention

Adopting a construction according to the invention helps make the focusing group comparatively lightweight and obtain a desired amount of residual spherical aberration combined with satisfactory optical performance from the infinite to the closest shooting distance while maintaining an f-number of about 1.4. Thus, it is possible to realize an inner-focus large-aperture medium-telephoto lens system that has satisfactory imaging performance from the infinite to the closest distance, that has a light focusing weight, and that allows easy setting of proper residual spherical aberration as desired, and to realize an imaging optical device and a digital appliance incorporating such a lens systems. Using an imaging optical device according to the invention in a digital appliance such as a digital camera makes it possible to additionally equip the digital appliance with a high-performance image input capability with a minimal increase in size.

BRIEF DESCRIPTION OF DRAWINGS

FIG. 5 comprises aberration diagrams of Example 1;

FIG. 6 comprises aberration diagrams of Example 2;

FIG. 7 comprises aberration diagrams of Example 3;

FIG. 8 comprises aberration diagrams of Example 4; and

DESCRIPTION OF EMBODIMENTS

Figure 1:
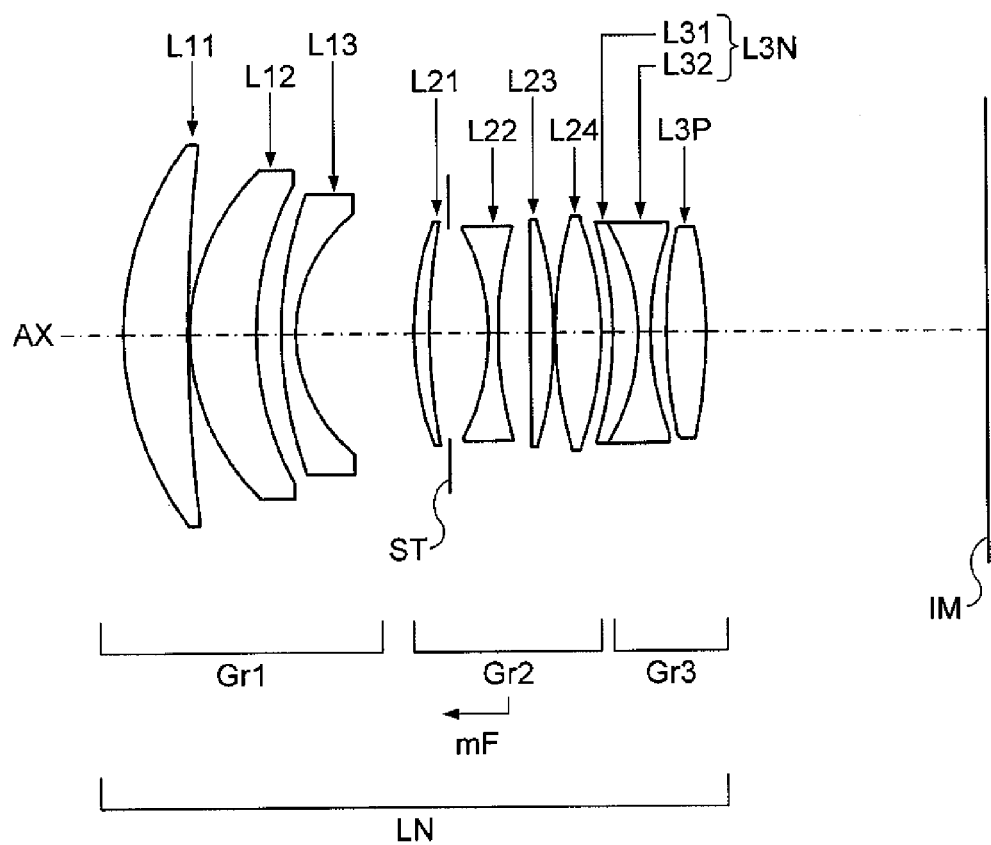
FIG. 1 is a lens construction diagram of a first embodiment (Example 1) of the invention.
Figure 2:
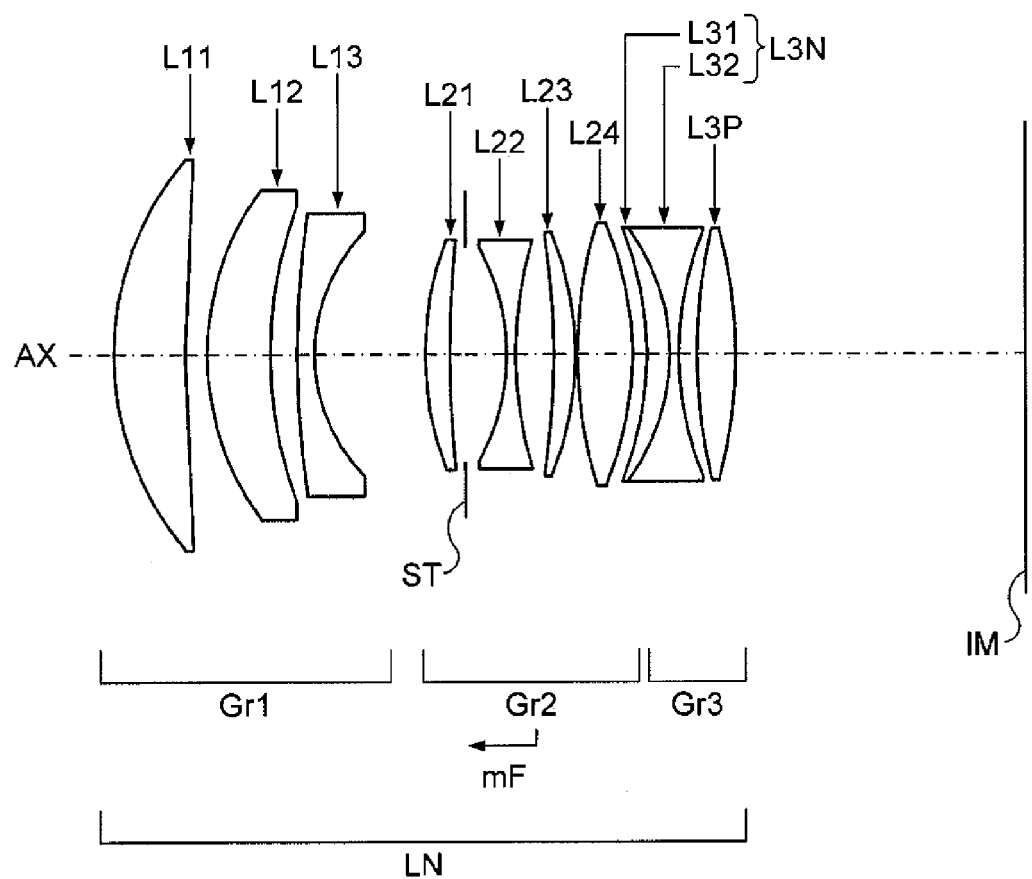
FIG. 2 is a lens construction diagram of a second embodiment (Example 2) of the invention.
Figure 3:
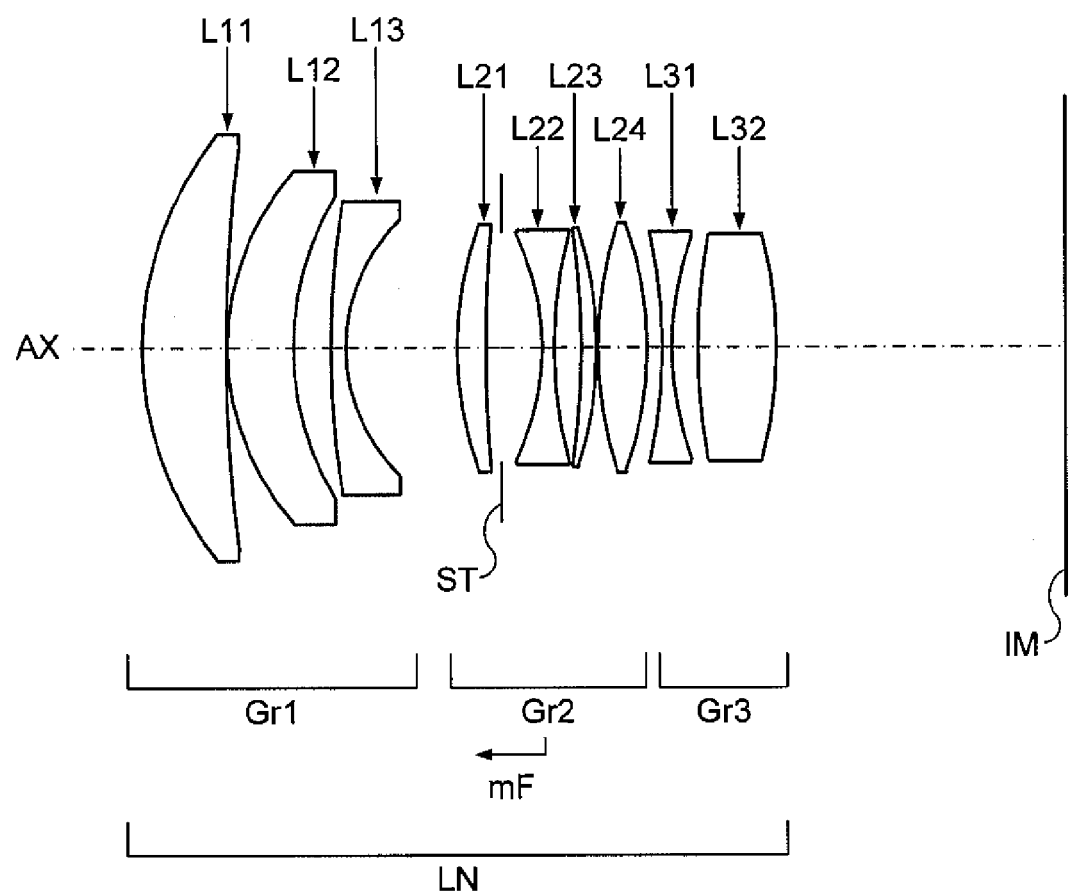
FIG. 3 is a lens construction diagram of a third embodiment (Example 3) of the invention.
Figure 4:
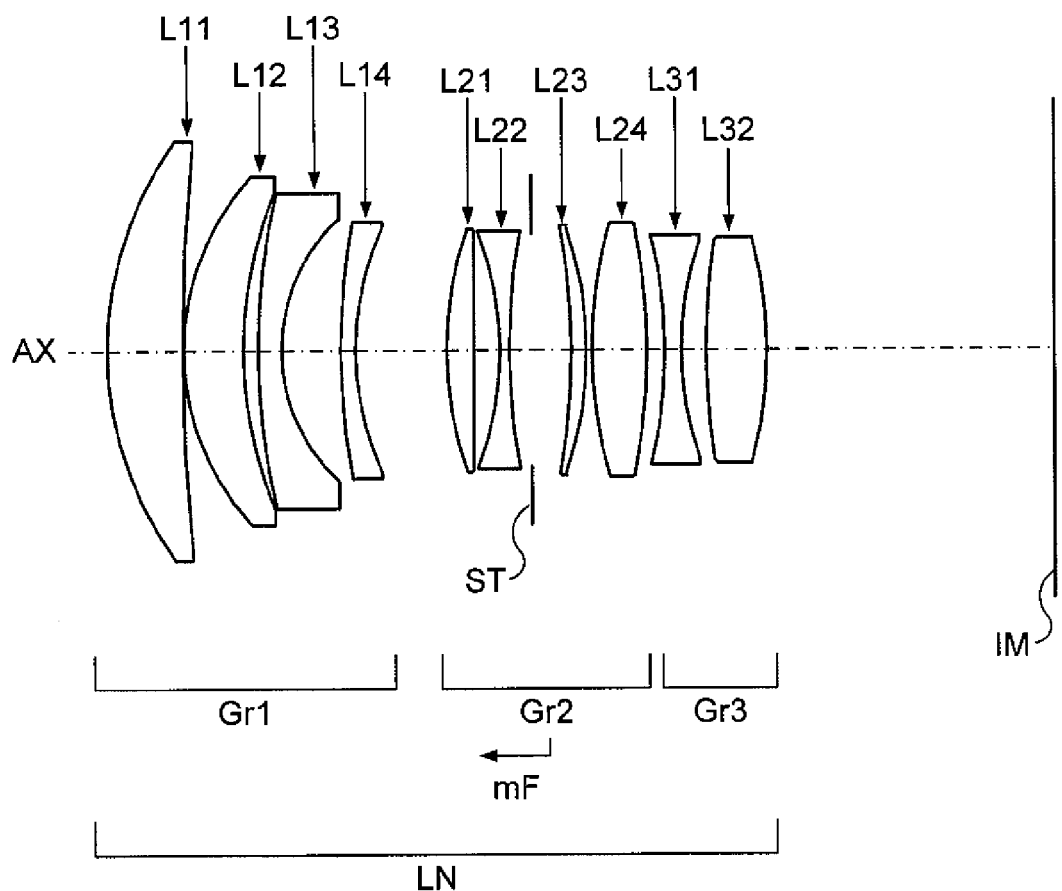
FIG. 4 is a lens construction diagram of a fourth embodiment (Example 4) of the invention.

Hereinafter, inner-focus large-aperture medium-telephoto lens systems, imaging optical devices, and digital appliances according to the invention will be described. An inner-focus large-aperture medium-telephoto lens system according to the invention includes, as lens groups, a first lens group having a positive refractive power, a second lens group having a positive refractive power, and a third lens group in order from the object side. For focusing on a close-distance object, while the first and third lens groups remain stationary relative to the image surface, the second lens group moves toward the object side. The second lens group includes only one negative lens element, and at least includes, in order from the object side, a positive lens element, a negative lens element, and a positive lens element. In addition, conditional formula (1) below is fulfilled.

$$-0.5 < (R1+R2)/(R1-R2) < -0.1 \quad (1)$$

where

R1 represents the radius of curvature of the object-side surface of the negative lens element in the second lens group; and R2 represents the radius of curvature of the image-side surface of the negative lens element in the second lens group.

To achieve stable chromatic aberration correction from the infinite to the closest distance, it is necessary that chromatic aberration be sufficiently corrected within the second lens group, which moves for focusing. Accordingly, the second lens group requires at least one negative lens element. To reduce the weight of the second lens group, which is a focusing group, it is preferable that the second lens group include as few lens elements as possible.

Out of the above considerations, it is preferable that the second lens group include one negative lens element. Here, it is preferable that, within the second lens group, a positive lens element, a negative lens element, and a positive lens element be arranged in this order from the object side. Arranging a negative lens element at the object-side end of the second lens group raises the axial ray height after passage through the negative lens element, thus increases the lens diameters after passage through the negative lens element, and thus increases the weight of the second lens group. On the other hand, arranging a negative lens element at the third or a later position in the second lens group results in two positive lens elements being arranged consecutively, and thus reduces the negative spherical aberration occurring in the first and second positive lens elements; doing so also increases the angles of incidence at which axial rays are incident on the negative lens element, and thus produces large positive spherical aberration in the negative lens element. As a result, spherical aberration tends to be corrected excessively. Here, spherical aberration bears a positive sign when it occurs in the direction from the object to the image surface.

Conditional formula (1) defines a preferable conditional range with respect to the shape of the negative lens element within the second lens group. Below the lower limit of conditional formula (1), the radius of curvature of the object-side surface of the negative lens element within the second lens group is too small, and this increases the positive spherical aberration occurring in the negative lens element within the second lens group, resulting in excessive correction of spherical aberration in the second lens group as a whole. Above the upper limit of conditional formula (1), the positive spherical aberration occurring in the negative lens element within the second lens group is insufficient, resulting in insufficient correction of spherical aberration in the second lens group as a whole.

Seeking satisfactory close-distance performance by sufficiently reducing the spherical aberration and curvature of field within the second lens group alone requires securing sufficient flexibility in aberration correction (that is, a sufficient number of lens elements) in the second lens group, and this makes the second lens group, which is a focusing group, heavier. By, as described above, designing the second lens group to include only one negative lens element and to have a positive lens element, a negative lens element, and a positive lens element arranged in this order from the object side, and giving the negative lens element an appropriate shape fulfilling conditional formula (1), it is possible to strike a good balance between the weight of the second lens group and the flexibility in aberration correction. Thus, despite the second lens group including only one negative lens element, it is possible to produce optimal amounts of spherical aberration etc. within the second lens group.

With the distinctive construction described above, it is possible to realize an large-aperture inner-focus medium-telephoto lens system with an f-number of about 1.4 which has a comparatively small focusing weight, which maintains a desired amount of residual spherical aberration, and which has satisfactory performance from the infinite to the closest shooting distance, and to realize an imaging optical device incorporating such a lens system. It is also possible to simplify the structure of, and reduce the weight of, the lens barrel of an imaging optical device; thus, by using such an imaging optical device in digital appliances such as digital cameras, it is possible to additionally equip them with a high-performance image input capability with a minimal increase in weight and size. It is thus possible to contribute to making digital appliances compact, high-performance, versatile, etc. Now, conditions and other features for obtaining those benefits with a good balance, and for achieving still higher optical performance, further size reduction, etc. will be discussed, It is preferable that the second lens group include, in order from the object side, a positive lens element, a negative lens element, a positive lens element, and a positive lens element and fulfill conditional formula (2) below.

$$-5 < f21/f22 < -1 \quad (2)$$

where $f21$ represents the focal length of the most object-side positive lens element in the second lens group; and $f22$ represents the focal length of the negative lens element in the second lens group.

The axial ray height after passage through the negative lens element in the second lens group is comparatively large; thus, by arranging two positive lens elements to the image side of the negative lens element, it is possible to further increase the flexibility in correction of spherical aberration. Fulfilling conditional formula (2) ensures this effect. Below the lower limit of conditional formula (2), the axial ray height after passage through the negative lens element is too large, and this increases the diameters of the two positive lens elements (that is, the second and third positive lens elements) located to the image side of the negative lens element, Consequently, the focusing group has an increased weight, which is undesirable. Moreover, the height at which rays are incident on the second and third positive lens elements is large, and thus large negative spherical aberration tends to occur. Above the upper limit of conditional formula (2), the axial ray height after passage through the negative lens element is insufficient, and thus the above-mentioned flexibility in spherical aberration correction diminishes.

It is preferable that conditional formulae (3) and (4) below be fulfilled.

$$0.05 < \beta 2 < 0.55 \quad (3)$$

$$0.9 < \beta 3 < 1.2 \quad (4)$$

where $\beta 2$ represents the paraxial lateral magnification of the second lens group in the infinity-focused condition; and $\beta 3$ represents the paraxial lateral magnification of the third lens group in the infinity-focused condition.

To reduce the focusing displacement while maintaining high performance, it is preferable that conditional formulae (3) and (4) be fulfilled. Below the lower limit of conditional formula (3), it is easy to reduce the focusing displacement, but the refractive power of the first lens group is reduced, hence the refractive power of the second lens group is increased, and thus the axial ray height in the second lens group is large. Consequently, the diameters of the lenses within the second lens group need to be increased, and hence the weight of the focusing group increases, which is undesirable. Moreover, it is difficult to correct spherical aberration etc. Above the upper limit of conditional formula (3), the focusing displacement cannot be reduced sufficiently. Above the upper limit of conditional formula (4), it is easy to reduce the focusing displacement, but the refractive power of the second lens group is increased, and thus it is difficult to suppress the focusing-induced variation in aberrations (for example, variation in spherical aberration), which is undesirable. Below the lower limit of conditional formula (4), the focusing displacement cannot be reduced sufficiently.

To ensure the above effects, it is further preferable that conditional formulae (3a) and (4a) below be fulfilled.

$$0.05 < \beta 2 < 0.44 \quad (3a)$$

$$0.98 < \beta 3 < 1.2 \quad (4a)$$

These conditional formulae (3a) and (4a) define conditional ranges, within the conditional ranges defined by conditional formulae (3) and (4) noted above, that should further preferably be fulfilled from the above-mentioned and other viewpoints. Thus, fulfilling at least one of conditional formulae (3a) and (4a) makes it possible to obtain more of the above-mentioned effects.

It is preferable that the third lens group include, in order from the object side, a negative lens component and a positive lens component. Since the second lens group includes only one negative lens element, from the viewpoints of correction of longitudinal and lateral chromatic aberrations in the entire optical system, it is preferable that a negative lens component be arranged also within the third lens group. When a negative lens component is arranged within the third lens group, it is preferable that, to its image side, a positive lens component be further arranged. When no positive lens component is arranged there, the off-axial rays emanating from the entire system have large angles, and this imposes restrictions on image sensors that can be used, which is undesirable.

It is preferable that the negative lens component in the third lens group be a cemented lens element produced by cementing together a positive meniscus lens element convex to the image side and a biconcave negative lens element. In that case, the cemented surfaces are convex to the image side. Then, while the astigmatism and distortion occurring at the cemented surfaces are comparatively suppressed, a desired amount of spherical aberration can be produced according to the difference between the refractive indices before and after the cemented surfaces and the radius of curvature of the cemented surfaces. That is, it is possible to control the amount of produced spherical aberration in a way comparatively independent of other aberrations. To ensure this effect, it is preferable that conditional formula (5) below be fulfilled.

That is, it is preferable that the negative lens component be a cemented lens element composed of a positive meniscus lens element convex to the image side and a biconcave negative lens element, and that conditional formula (5) below be fulfilled. Below the lower limit of conditional formula (5), the difference between the refractive indices before and after the cemented surfaces is too small, and thus it is difficult to produce a sufficient amount of spherical aberration.

$$|nL31-nL32|>0.2 \quad (5)$$

where $nL31$ represents the refractive index of the positive meniscus lens element convex to the image side; and $nL32$ represents the refractive index of the biconcave negative lens element.

It is preferable that conditional formula (6) below be fulfilled $$0.5<f2/f<0.85 \quad (6)$$

where $f2$ represents the focal length of the second lens group; and $f$ represents the focal length of the entire system.

Conditional formula (6) defines a preferable conditional range with respect to the focal length of the second lens group. Below the lower limit of conditional formula (6), the refractive power of the second lens group is too strong, and thus it is difficult to suppress focusing-induced variation in aberrations (for example, variation in spherical aberration), which is undesirable. Above the upper limit of conditional formula (6), the entire optical system is unduly large, which is undesirable. An attempt to reduce the size of the entire system makes it necessary to increase the refractive power of the third lens group, and this degrades off-axial aberrations (such as curvature of field and distortion).

An inner-focus large-aperture medium-telephoto lens system according to the invention is suitable for use as an imaging lens for digital appliances (for example, digital cameras) equipped with an image input capability, and can be combined with an image sensor or the like to build an imaging optical device that optically takes in an image of a subject and outputs it in the form of an electrical signal. An imaging optical device is an optical device that constitutes a main component of cameras used to shoot still and moving images of a subject, and is composed of, in order from the object side (that is, the subject side), an inner-focus large-aperture medium-telephoto lens system which forms an optical image of an object, and an image sensor which converts the optical image formed by the inner-focus large-aperture medium-telephoto lens system into an electrical signal.

Examples of cameras include digital cameras, video cameras, monitoring cameras, vehicle-mounted cameras, and videophone cameras, etc.; and cameras incorporated in or externally attached to personal computers, portable information devices (for example, compact, portable information device terminals such as mobile computers, cellular phones, portable information terminals), peripheral devices for those (such as scanners, printers, etc.), and other digital devices. As these examples suggest, not only can an imaging optical device be used to build a camera, but an imaging optical device can also be incorporated in various digital appliances to additionally equip them with camera capabilities. For example, it is possible to build digital appliances equipped with an image input capability, such as camera-equipped cellular phones.

Figure 9:
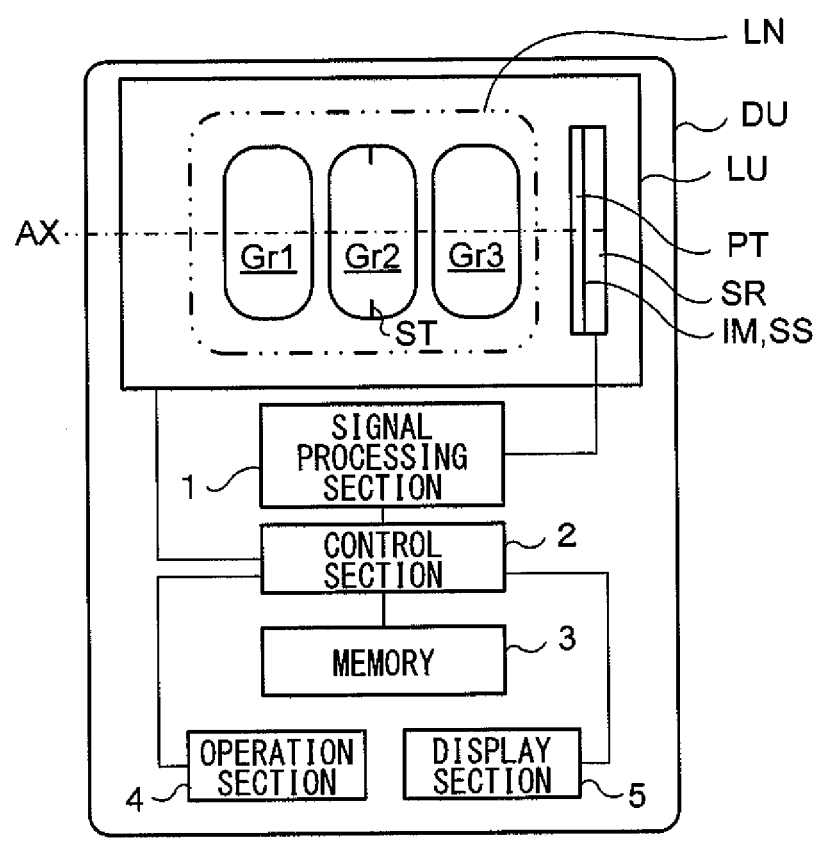
FIG. 9 is a diagram showing an example of an outline of the configuration of a digital appliance incorporating an imaging optical device.

FIG. 9 shows an example of an outline of the configuration of a digital appliance DU equipped with an image input capability, in a schematic sectional view. The digital appliance DU shown in FIG. 9 incorporates an imaging optical device LU, which includes, in order from the object side (that is, subject side), an inner-focus large-aperture medium-telephoto lens system LN (AX representing its optical axis) which forms an optical image (image surface) IM of an object, a parallel-plane plate PT (corresponding to an optical filter arranged as necessary, such as an optical low-pas filter and an infrared cut filter, and the cover glass etc. of an image sensor SR), and an image sensor SR which converts the optical image IM formed on a sensing surface SS by the inner-focus large-aperture medium-telephoto lens system LN into an electrical signal. When a digital appliance DU is built by use of an imaging optical device LU, the latter is typically housed inside the body of the former; however, any configuration that suits specific needs may be adopted to realize camera capabilities. For example, an imaging optical device LU in the form of a unit may be designed to be detachable from, or rotatable relative to, the body of a digital appliance DU.

Used as the image sensor SR is, for example, a solid-state image sensor, such as a CCD image sensor or a CMOS image sensor, that has a plurality of pixels. The inner-focus large-aperture medium-telephoto lens system LN is so arranged that the optical image IM of the subject is formed on the sensing surface SS of the image sensor SR; thus, the optical image IM formed by the inner-focus large-aperture medium-telephoto lens system LN is converted into an electrical signal by the image sensor SR.

The digital appliance DU includes, in addition to the imaging optical device LU, a signal processing section 1, a control section 2, a memory 3, an operation section 4, a display section 5, etc. The signal generated by the image sensor SR is then, in the signal processing section 1, subjected to predetermined processing such as digital image processing and image compression, and is then, in the form of a digital video signal, recorded to the memory 3 (such as a semiconductor memory or an optical disc) and, as the case may be, transferred to an external appliance (for example, the communication capabilities of a cellular phone) via a cable or after being converted into an infrared signal or the like. The control section 2 includes a microcomputer, and performs, in a concentrated fashion, control of shooting functions (functions for shooting still and moving images) and image playback and other functions, control of a lens moving mechanism for focusing, etc. For example, the control section 2 controls the imaging optical device LU to shoot either a still image or a moving image of the subject. The display section 5 includes a display device such as a liquid crystal monitor, and displays images by use of the image signal resulting from the conversion by the image sensor SR or image information recorded on the memory 3. The operation section 4 includes operated members such as operation buttons (for example, a shutter release button) and an operation dial (for example, a shooting mode dial), and conveys the information fed in through the user's operation to the control section 2.

The inner-focus large-aperture medium-telephoto lens system LN includes, as lens groups, a first lens group Gr1 having a positive refractive power, a second lens group Gr2 having a positive refractive power, and a third lens group Gr3 in order from the object side. While the first and third lens groups Gr1 and Gr3 are kept stationary relative to the image surface IM, the second lens group Gr2 is moved toward the object side to perform focusing on a close-distance object, so that an optical image IM is formed on the sensing surface SS of the image sensor SR. The optical image IM to be formed by the inner-focus large-aperture medium-telephoto lens system LN has, for example by passing through an optical low-pass filter (corresponding to the parallel-plane plate PT in FIG. 9) having predetermined cut-off frequency characteristics determined by the pixel pitch of the image sensor SR, its spatial frequency characteristics so adjusted as to minimize the so-called aliasing noise that occurs in conversion into an electrical signal. This helps suppress color moiré. However, when the performance around the resolution limit frequency is held modest, even without the use of an optical low-pass filter, there is no need to care about noise; in a case where the user shoots and views images by use of a display system on which noise is not very conspicuous (for example, the liquid crystal display screen of a cellular phone), there is no need to use an optical low-pass filter.

Next, by way of a first to a fourth embodiment, specific optical constructions of the inner-focus large-aperture medium-telephoto lens system LN will be described in more detail. FIGS. 1 to 4 are lens construction diagrams showing, in an optical section, the inner-focus large-aperture medium-telephoto lens system LN in an infinity-focused condition (in a first focus position POS 1) in the first to fourth embodiments, respectively. The movement of the focusing group (namely, the second lens group) for focusing from infinity to a close distance is indicated by arrow mF in FIGS. 1 to 4 (the first and third lens groups Gr1 and Gr3 are kept stationary during focusing).

The inner-focus large-aperture medium-telephoto lens system LN of the first embodiment (FIG. 1) is composed of three lens groups Gr1, Gr2, and Gr3 all having a positive refractive power. The first lens group Gr1 is composed of, in order from the object side, two positive meniscus lens elements L11 and L12 convex to the object side and a negative meniscus lens element L13 concave to the image side. The second lens group Gr2 is composed of, in order from the object side, a positive meniscus lens element convex to the object side, an aperture stop ST, a biconcave negative lens element L22, a positive meniscus lens element L23 convex to the image side, and a biconvex positive lens element L24. The third lens group Gr3 is composed of, in order from the object side, a cemented lens element L3N composed of a positive meniscus lens element L31 convex to the image side and a biconcave negative lens element L32, and a biconvex positive lens element L3P.

The inner-focus large-aperture medium-telephoto lens system LN of the second embodiment (FIG. 2) is composed of three lens groups Gr1, Gr2, and Gr3 all having a positive refractive power. The first lens group Gr1 is composed of, in order from the object side, two positive meniscus lens elements L11 and L12 convex to the object side and a negative meniscus lens element L13 concave to the image side. The second lens group Gr2 is composed of, in order from the object side, a positive meniscus lens element convex to the object side, an aperture stop ST, a biconcave negative lens element L22, a positive meniscus lens element L23 convex to the image side, and a biconvex positive lens element L24. The third lens group Gr3 is composed of, in order from the object side, a cemented lens element L3N composed of a positive meniscus lens element L31 convex to the image side and a biconcave negative lens element L32, and a biconvex positive lens element L3P.

The inner-focus large-aperture medium-telephoto lens system LN of the third embodiment (FIG. 3) is composed of three lens groups Gr1, Gr2, and Gr3 all having a positive refractive power. The first lens group Gr1 is composed of, in order from the object side, two positive meniscus lens elements L11 and L12 convex to the object side and a negative meniscus lens element L13 concave to the image side. The second lens group Gr2 is composed of, in order from the object side, a positive meniscus lens element convex to the object side, an aperture stop ST, a biconcave negative lens element L22, a positive meniscus lens element L23 convex to the image side, and a biconvex positive lens element L24. The third lens group Gr3 is composed of, in order from the object side, a biconcave negative lens element L31 and a biconvex positive lens element L32.

The inner-focus large-aperture medium-telephoto lens system LN of the fourth embodiment (FIG. 4) is composed of three lens groups Gr1, Gr2, and Gr3 all having a positive refractive power. The first lens group On is composed of, in order from the object side, two positive meniscus lens elements L11 and L12 convex to the object side and two negative meniscus lens elements L13 and L14 concave to the image side. The second lens group Gr2 is composed of, in order from the object side, a biconvex positive lens element L21, a biconcave negative lens element L22, an aperture stop ST, a positive meniscus lens element L23 convex to the image side, and a biconvex positive lens element L24. The third lens group Gr3 is composed of, in order from the object side, a biconcave negative lens element L31 and a biconvex positive lens element L32.

EXAMPLES

The constructions and other features of inner-focus large-aperture medium-telephoto lens systems embodying the invention will now be described in more detail with reference to their construction data and other data. Examples 1 to 4 (EX1 to EX4) presented below are numerical examples corresponding to the first to fourth embodiments, respectively, described previously, and the lens construction diagrams (FIGS. 1 to 4) showing the first to fourth embodiments also show the optical constructions of the corresponding ones of Examples 1 to 4.

In the construction data of each example, listed as surface data are, from the leftmost column rightward, surface number, radius of curvature r (mm), axial surface-to-surface distance d (mm), refractive index nd for the d-line (with a wavelength of 587.56 nm), and Abbe number vd for the d-line. Listed as miscellaneous data are, with respect to the entire system, focal length of (f, mm), f-number (FNO), half angle of view (ω, °), image height (y' max, mm), total lens length (TL, mm), and back focal length (BF, mm). The back focal length is the distance from the last lens surface to the paraxial image surface as given as an air-equivalent length, and the total lens length is the sum of the distance from the foremost to the last lens surface and the back focal length. Listed as focus data are variables distances (those axial surface-to-surface distances which vary during focusing) between the first focus position POS 1 (infinity-focused condition) and the second focus position POS2 (closest-focused condition) along with the lateral magnification β of the entire system. Listed as lens group data are the focal length and paraxial lateral magnification of each lens group along with the lens data of the second and third lens groups. The values of the conditional formulae as observed in each example are listed in Table 1.

FIGS. 5 to 8 comprise aberration diagrams corresponding to Examples 1 to 4 (EX1 to EX4) respectively, the graphs in the upper and lower rows showing the aberrations (from left, spherical aberration etc., astigmatism, and distortion) at the focus positions POS1 and POS2 respectively. In FIGS. 5 to 8, FNO represents the f-number, Y' (mm) represents the maximum image height y' max (corresponding to the distance form the optical axis AX) on the sensing surface SS of the image sensor SR. In the spherical aberration diagrams, the solid line d, dash-and-dot line g, and dash-dot-dot line c represent the spherical aberrations (mm) for the d-, g-, and c-lines respectively, and the broken like SC represents the deviation (mm) from the sine condition. In the astigmatism diagrams, the broken line DM and the solid line DS represent the astigmatism (mm) for the d-line on the meridional and sagittal surfaces, respectively. In the distortion diagrams, the solid line represents the distortion (%) for the d-line.

Example 1

Unit: mm

Surface Data

| Surf. No. | r | d | nd | vd |
|---|---|---|---|---|
| Object Surface | ∞ | d0 | | |
| 1 | 54.231 | 9.430 | 1.62041 | 60.3 |
| 2 | 281.169 | 0.300 | | |
| 3 | 39.221 | 9.640 | 1.80400 | 46.6 |
| 4 | 54.944 | 3.708 | | |
| 5 | 72.063 | 2.090 | 1.80610 | 33.3 |
| 6 | 26.207 | d6 | | |
| 7 | 55.974 | 2.310 | 1.83481 | 42.7 |
| 8 | 105.851 | 2.814 | | |
| 9 (Aperture) | ∞ | 5.935 | | |
| 10 | −40.001 | 1.200 | 1.69895 | 30.1 |
| 11 | 67.072 | 5.137 | | |
| 12 | −426.237 | 3.070 | 1.88300 | 40.8 |
| 13 | −71.448 | 0.150 | | |
| 14 | 71.673 | 6.873 | 1.72916 | 54.7 |
| 15 | −58.340 | d15 | | |
| 16 | −66.600 | 3.700 | 1.90366 | 31.3 |
| 17 | −37.963 | 1.690 | 1.64769 | 33.8 |
| 18 | 51.067 | 2.267 | | |
| 19 | 85.957 | 6.000 | 1.83400 | 37.2 |
| 20 | −85.957 | BF | | |
| Image Surface | ∞ | | | |

Miscellaneous Data

| | |
|---|---|
| f = | 85.000 |
| FNO = | 1.450 |
| ω = | 14.333° |
| y'max = | 21.630 |
| TL = | 126.370 |
| BF = | 41.050 |

Focus Data

| | POS1 | POS2 |
|---|---|---|
| β | 0 | −0.1175 |
| d0 | ∞ | 719.0 |
| d6 | 17.306 | 7.706 |
| d15 | 1.700 | 11.300 |

Lens Group Data (Focal Length)

| Group (Surface) | Focal Length |
|---|---|
| 1(1-6) | 252.708 |
| 2(7-15) | 61.918 |
| 3(16-20) | 684.522 |

Lens Group Data (Paraxial Lateral Magnification)

| Group (Surface) | Paraxial Lateral Magnification | |
|---|---|---|
| | POS1 | POS2 |
| β | 0 | −0.1175 |
| 1(1-6) | — | −0.676 |
| 2(7-15) | 0.321 | 0.166 |
| 3(16-20) | 1.048 | 1.048 |

Lens Data of 2nd and 3rd Lens Group

| Lens (Surface) | Focal Length |
|---|---|
| L21(7-8) | 139.360 |
| L22(10-11) | −35.685 |
| L23(12-13) | 96.817 |
| L24(14-15) | 45.114 |
| L3N(16-18) | −50.627 |
| L3P(19-20) | 52.364 |

Example 2

Unit: mm

Surface Data

| Surf. No. | r | d | nd | vd |
|---|---|---|---|---|
| Object Surface | ∞ | d0 | | |
| 1 | 51.087 | 10.100 | 1.62299 | 58.1 |
| 2 | 368.515 | 3.194 | | |
| 3 | 47.473 | 9.000 | 1.83481 | 42.7 |
| 4 | 73.939 | 3.786 | | |
| 5 | 164.321 | 2.500 | 1.80610 | 33.3 |
| 6 | 29.606 | d6 | | |
| 7 | 56.641 | 3.520 | 1.72916 | 54.7 |
| 8 | 205.821 | 2.181 | | |
| 9 (Aperture) | ∞ | 5.982 | | |
| 10 | −38.670 | 1.200 | 1.68893 | 31.2 |
| 11 | 68.753 | 5.446 | | |
| 12 | −137.340 | 3.110 | 1.80420 | 46.5 |

-continued

Unit: mm

| | | | | |
|---|---|---|---|---|
| 13 | −55.396 | 0.150 | | |
| 14 | 77.865 | 8.000 | 1.77250 | 49.7 |
| 15 | −58.203 | d15 | | |
| 16 | −58.256 | 3.300 | 1.90366 | 31.3 |
| 17 | −36.511 | 1.200 | 1.62004 | 36.3 |
| 18 | 55.467 | 2.612 | | |
| 19 | 93.747 | 5.530 | 1.83481 | 42.7 |
| 20 | −83.109 | BF | | |
| Image Surface | ∞ | | | |

Miscellaneous Data

| | |
|---|---|
| f = | 85.000 |
| FNO = | 1.450 |
| ω = | 14.272° |
| y'max = | 21.630 |
| TL = | 129.630 |
| BF = | 41.130 |

Focus Data

| | POS1 | POS2 |
|---|---|---|
| β | 0 | −0.1182 |
| d0 | ∞ | 719.0 |
| d6 | 15.690 | 6.210 |
| d15 | 2.000 | 11.480 |

Lens Group Data (Focal Length)

| Group (Surface) | Focal Length |
|---|---|
| 1(1-6) | 334.499 |
| 2(7-15) | 58.730 |
| 3(16-20) | 581.893 |

Lens Group Data (Paraxial Lateral Magnification)

| | Paraxial Lateral Magnification | |
|---|---|---|
| Group (Surface) | POS1 | POS2 |
| β | 0 | −0.1182 |
| 1(1-6) | — | −1.371 |
| 2(7-15) | 0.244 | 0.083 |
| 3(16-20) | 1.040 | 1.040 |

Lens Data of 2nd and 3rd Lens Group

| Lens (Surface) | Focal Length |
|---|---|
| L21(7-8) | 106.118 |
| L22(10-11) | −35.762 |
| L23(12-13) | 113.530 |
| L24(14-15) | 44.249 |
| L3N(16-18) | −52.421 |
| L3P(19-20) | 53.533 |

Example 3

Unit: mm

Surface Data

| Surf. No. | r | d | nd | vd |
|---|---|---|---|---|
| Object Surface | ∞ | d0 | | |
| 1 | 54.741 | 11.500 | 1.80420 | 46.5 |
| 2 | 273.211 | 0.150 | | |
| 3 | 43.392 | 9.000 | 1.83481 | 42.7 |
| 4 | 48.023 | 5.082 | | |
| 5 | 149.419 | 2.000 | 1.75520 | 27.5 |
| 6 | 28.782 | d6 | | |
| 7 | 59.027 | 4.000 | 1.80420 | 46.5 |

-continued

Unit: mm

| | | | | |
|---|---|---|---|---|
| 8 | 238.251 | 1.993 | | |
| 9 (Aperture) | ∞ | 5.691 | | |
| 10 | −42.444 | 1.500 | 1.75520 | 27.5 |
| 11 | 72.530 | 3.793 | | |
| 12 | −149.425 | 2.080 | 1.90366 | 31.3 |
| 13 | −65.596 | 0.150 | | |
| 14 | 67.405 | 6.800 | 1.80420 | 46.5 |
| 15 | −60.737 | d15 | | |
| 16 | −89.123 | 1.200 | 1.62004 | 36.3 |
| 17 | 51.566 | 3.622 | | |
| 18 | 105.138 | 10.700 | 1.83400 | 37.4 |
| 19 | −73.135 | BF | | |
| Image Surface | ∞ | | | |

Miscellaneous Data

| | |
|---|---|
| f = | 85.000 |
| FNO = | 1.430 |
| ω = | 14.312° |
| y'max = | 21.630 |
| TL = | 125.783 |
| BF = | 39.352 |

Focus Data

| | POS1 | POS2 |
|---|---|---|
| β | 0 | −0.1190 |
| d0 | ∞ | 733.7 |
| d6 | 15.170 | 5.750 |
| d15 | 2.000 | 11.421 |

Lens Group Data (Focal Length)

| Group (Surface) | Focal Length |
|---|---|
| 1(1-6) | 410.187 |
| 2(7-15) | 58.267 |
| 3(16-20) | 412.177 |

Lens Group Data (Paraxial Lateral Magnification)

| | Paraxial Lateral Magnification | |
|---|---|---|
| Group (Surface) | POS1 | POS2 |
| β | 0 | −0.1190 |
| 1(1-6) | — | −3.046 |
| 2(7-15) | 0.199 | 0.038 |
| 3(16-20) | 1.040 | 1.040 |

Lens Data of 2nd and 3rd Lens Group

| Lens (Surface) | Focal Length |
|---|---|
| L21(7-8) | 96.611 |
| L22(10-11) | −35.257 |
| L23(12-13) | 127.884 |
| L24(14-15) | 40.690 |
| L3N(16-17) | −52.512 |
| L3P(18-19) | 53.168 |

Example 4

Unit: mm

Surface Data

| Surf. No. | r | d | nd | vd |
|---|---|---|---|---|
| Object Surface | ∞ | d0 | | |
| 1 | 58.198 | 10.315 | 1.83400 | 37.4 |

-continued

Unit: mm

| | | | | |
|---|---|---|---|---|
| 2 | 327.344 | 0.150 | | |
| 3 | 41.681 | 8.179 | 1.90366 | 31.3 |
| 4 | 68.701 | 2.081 | | |
| 5 | 113.319 | 3.181 | 1.84666 | 23.8 |
| 6 | 28.999 | 8.083 | | |
| 7 | 113.963 | 2.000 | 1.84666 | 23.8 |
| 8 | 48.226 | d8 | | |
| 9 | 59.704 | 4.038 | 1.80420 | 46.5 |
| 10 | −581.028 | 3.379 | | |
| 11 | −53.503 | 1.250 | 1.75520 | 27.5 |
| 12 | 108.784 | 2.972 | | |
| 13 (Aperture) | ∞ | 5.557 | | |
| 14 | −119.440 | 2.052 | 1.80420 | 46.5 |
| 15 | −64.727 | 0.650 | | |
| 16 | 76.704 | 7.612 | 1.83481 | 42.7 |
| 17 | −105.687 | d17 | | |
| 18 | −80.068 | 2.164 | 1.58144 | 40.9 |
| 19 | 54.853 | 3.385 | | |
| 20 | 120.062 | 8.399 | 1.83481 | 42.7 |
| 21 | −72.076 | BF | | |
| Image Surface | ∞ | | | |

Miscellaneous Data

| | |
|---|---|
| f = | 85.000 |
| FNO = | 1.430 |
| ω = | 14.418° |
| y'max = | 21.630 |
| TL = | 129.778 |
| BF = | 39.350 |

Focus Data

| | POS1 | POS2 |
|---|---|---|
| β | 0 | −0.1207 |
| d0 | ∞ | 733.7 |
| d8 | 12.462 | 2.731 |
| d17 | 2.520 | 12.250 |

Lens Group Data (Focal Length)

| Group (Surface) | Focal Length |
|---|---|
| 1(1-6) | 1228.605 |
| 2(7-15) | 52.971 |
| 3(16-20) | 410.214 |

Lens Group Data (Paraxial Lateral Magnification)

| | Paraxial Lateral Magnification | |
|---|---|---|
| Group (Surface) | POS1 | POS2 |
| β | 0 | −0.1207 |
| 1(1-6) | — | 1.017 |
| 2(7-15) | 0.068 | −0.116 |
| 3(16-20) | 1.023 | 1.023 |

Lens Data of 2nd and 3rd Lens Group

| Lens (Surface) | Focal Length |
|---|---|
| L21(9-10) | 67.512 |
| L22(11-12) | −47.333 |
| L23(14-15) | 172.815 |
| L24(16-17) | 54.272 |
| L3N(18-19) | −55.657 |
| L3P(20-21) | 55.045 |

TABLE 1

| Conditional Formula | | Example 1 | Example 2 | Example 3 | Example 4 |
|---|---|---|---|---|---|
| (1) | (R1 + R2)/(R1 − R2) | −0.253 | −0.280 | −0.262 | −0.341 |
| (2) | f21/f22 | −3.905 | −2.967 | −2.740 | −1.426 |
| (3) | β2 | 0.321 | 0.244 | 0.199 | 0.068 |
| (4) | β3 | 1.048 | 1.040 | 1.040 | 1.023 |
| (5) | |nL31 − nL32| | 0.256 | 0.284 | — | — |
| (6) | f2/f | 0.728 | 0.691 | 0.685 | 0.623 |

LIST OF REFERENCE SIGNS

DU digital appliance
LU imaging optical device
LN inner-focus large-aperture medium-telephoto lens system
Gr1 first lens group
Gr2 second lens group
Gr3 third lens group
ST aperture stop (aperture)
SR image sensor
SS sensing surface
IM image surface (optical image)
AX optical axis
1 signal processing section
2 control section
3 memory
4 operation section
5 display section

The invention claimed is:

1. An inner-focus large-aperture medium-telephoto lens system comprising, as lens groups, a first lens group having a positive refractive power, a second lens group having a positive refractive power, and a third lens group in order from an object side, wherein
for focusing on a close-distance object, the first and third lens groups remain stationary relative to an image surface and the second lens group moves toward the object side,
the second lens group includes only one negative lens element and at least includes, in order from the object side, a positive lens element, a negative lens element, and a positive lens element, and
conditional formula (1) below is fulfilled:

$$-0.5 < (R1+R2)/(R1-R2) < -0.1 \qquad (1)$$

where
R1 represents a radius of curvature of an object-side surface of the negative lens element in the second lens group; and
R2 represents a radius of curvature of an image-side surface of the negative lens element in the second lens group.

2. The inner-focus large-aperture medium-telephoto lens system according to claim 1, wherein
the second lens group has, in order from the object side, a positive lens element, a negative lens element, a positive lens element, and a positive lens element, and conditional formula (2) below is fulfilled:

$$-5 < f21/f22 < -1 \qquad (2)$$

where
f21 represents a focal length of a most object-side positive lens element in the second lens group; and
f22 represents a focal length of the negative lens element in the second lens group.

3. The inner-focus large-aperture medium-telephoto lens system according to claim 1, wherein formulae (3) and (4) below are fulfilled:

$$0.05 < \beta 2 < 0.55 \quad (3)$$

$$0.9 < \beta 3 < 1.2 \quad (4)$$

where
- β2 represents a paraxial lateral magnification of the second lens group in an infinity-focused condition; and
- β3 represents a paraxial lateral magnification of the third lens group in the infinity-focused condition.

4. The inner-focus large-aperture medium-telephoto lens system according to claim 2, wherein formulae (3) and (4) below are fulfilled:

$$0.05 < \beta 2 < 0.55 \quad (3)$$

$$0.9 < \beta 3 < 1.2 \quad (4)$$

where
- β2 represents a paraxial lateral magnification of the second lens group in an infinity-focused condition; and
- β3 represents a paraxial lateral magnification of the third lens group in the infinity-focused condition.

5. The inner-focus large-aperture medium-telephoto lens system according to claim 1, wherein the third lens group has, in order from the object side, a negative lens component and a positive lens component.

6. The inner-focus large-aperture medium-telephoto lens system according to claim 2, wherein the third lens group has, in order from the object side, a negative lens component and a positive lens component.

7. The inner-focus large-aperture medium-telephoto lens system according to claim 3, wherein the third lens group has, in order from the object side, a negative lens component and a positive lens component.

8. The inner-focus large-aperture medium-telephoto lens system according to claim 5, wherein the negative lens component is a cemented lens element produced by cementing together a positive meniscus lens element convex to an image side and a biconcave negative lens element, and conditional formula (5) below is fulfilled:

$$|nL31 - nL32| > 0.2 \quad (5)$$

where
- nL31 represents a refractive index of the positive meniscus lens element convex to the image side; and
- nL32 represents a refractive index of the biconcave negative lens element.

9. The inner-focus large-aperture medium-telephoto lens system according to claim 6, wherein the negative lens component is a cemented lens element produced by cementing together a positive meniscus lens element convex to an image side and a biconcave negative lens element, and conditional formula (5) below is fulfilled:

$$|nL31 - nL32| > 0.2 \quad (5)$$

where
- nL31 represents a refractive index of the positive meniscus lens element convex to the image side; and
- nL32 represents a refractive index of the biconcave negative lens element.

10. The inner-focus large-aperture medium-telephoto lens system according to claim 7, wherein the negative lens component is a cemented lens element produced by cementing together a positive meniscus lens element convex to an image side and a biconcave negative lens element, and conditional formula (5) below is fulfilled:

$$|nL31 - nL32| > 0.2 \quad (5)$$

where
- nL31 represents a refractive index of the positive meniscus lens element convex to the image side; and
- nL32 represents a refractive index of the biconcave negative lens element.

11. The inner-focus large-aperture medium-telephoto lens system according to claim 1, wherein conditional formula (6) below is fulfilled:

$$0.5 < f2/f < 0.85 \quad (6)$$

where
- f2 represents a focal length of the second lens group; and
- f represents a focal length of the entire system.

12. The inner-focus large-aperture medium-telephoto lens system according to claim 2, wherein conditional formula (6) below is fulfilled:

$$0.5 < f2/f < 0.85 \quad (6)$$

where
- f2 represents a focal length of the second lens group; and
- f represents a focal length of the entire system.

13. The inner-focus large-aperture medium-telephoto lens system according to claim 3, wherein conditional formula (6) below is fulfilled:

$$0.5 < f2/f < 0.85 \quad (6)$$

where
- f2 represents a focal length of the second lens group; and
- f represents a focal length of the entire system.

14. An imaging optical device comprising the inner-focus large-aperture medium-telephoto lens system according to claim 1 and an image sensor which converts an optical image formed on a sensing surface thereof into an electrical signal, wherein the inner-focus large-aperture medium-telephoto lens system is so arranged that an optical image of a subject is formed on the sensing surface of the image sensor.

15. An imaging optical device comprising the inner-focus large-aperture medium-telephoto lens system according to claim 2 and an image sensor which converts an optical image formed on a sensing surface thereof into an electrical signal, wherein the inner-focus large-aperture medium-telephoto lens system is so arranged that an optical image of a subject is formed on the sensing surface of the image sensor.

16. An imaging optical device comprising the inner-focus large-aperture medium-telephoto lens system according to claim 3 and an image sensor which converts an optical image formed on a sensing surface thereof into an electrical signal, wherein the inner-focus large-aperture medium-telephoto lens system is so arranged that an optical image of a subject is formed on the sensing surface of the image sensor.

17. An imaging optical device comprising the inner-focus large-aperture medium-telephoto lens system according to claim 5 and an image sensor which converts an optical image formed on a sensing surface thereof into an electrical signal, wherein the inner-focus large-aperture medium-telephoto lens system is so arranged that an optical image of a subject is formed on the sensing surface of the image sensor.

18. An imaging optical device comprising the inner-focus large-aperture medium-telephoto lens system according to claim 8 and an image sensor which converts an optical image formed on a sensing surface thereof into an electrical signal, wherein the inner-focus large-aperture medium-telephoto lens system is so arranged that an optical image of a subject is formed on the sensing surface of the image sensor.

19. An imaging optical device comprising the inner-focus large-aperture medium-telephoto lens system according to claim 11 and an image sensor which converts an optical image formed on a sensing surface thereof into an electrical signal,
wherein the inner-focus large-aperture medium-telephoto lens system is so arranged that an optical image of a subject is formed on the sensing surface of the image sensor.

20. A digital appliance comprising the imaging optical device according to claim 14, the digital appliance thereby being additionally equipped with at least one of a function of shooting a still image of the subject and a function of shooting a moving image of the subject.

* * * * *